(12) United States Patent
Tarver, III

(10) Patent No.: US 6,530,159 B2
(45) Date of Patent: Mar. 11, 2003

(54) MEASURING TAPE FOR HANDLING DRYWALL

(76) Inventor: John Tarver, III, 168 Hanna Ave., Dayton, OH (US) 45427

( * ) Notice: Subject to any disclaimer, the term of this patent is extended or adjusted under 35 U.S.C. 154(b) by 56 days.

(21) Appl. No.: 09/796,611

(22) Filed: Jan. 10, 2001

(65) Prior Publication Data

US 2002/0017031 A1 Feb. 14, 2002

Related U.S. Application Data

(63) Continuation-in-part of application No. 09/384,676, filed on Aug. 27, 1999, now abandoned.

(51) Int. Cl.⁷ .................................................. G01B 3/10
(52) U.S. Cl. ............................................ 33/759; 33/494
(58) Field of Search .......................... 33/759, 483, 484, 33/755, 766, 679.1, 668, 42, 494

(56) References Cited

U.S. PATENT DOCUMENTS

| 442,020 A | 12/1890 | Draling | 33/483 |
| 922,580 A | 5/1909 | Hansen | 33/458 |
| 3,270,421 A | * 9/1966 | Jones | 33/759 |
| 4,301,596 A | * 11/1981 | Sedlock | 33/494 |
| 5,335,421 A | 8/1994 | Jones, Jr. | 33/494 |
| 6,070,338 A | * 6/2000 | Garity | 33/42 |

* cited by examiner

*Primary Examiner*—Christopher W. Fulton
(74) *Attorney, Agent, or Firm*—R. William Graham

(57) ABSTRACT

A measuring tape member which is of a length substantially equal to a work piece, the member has a side which includes a first set of incremental sequentially increasing measuring units printed thereon which begin at a first point of the member and are equidistantly spatially positioned along the member through to a second point, and a second set of incremental sequentially increasing measuring units printed thereon which begin at the second point of the member and are equidistantly spatially positioned along the member through to the first point. The measuring units are positioned on the tape in a manner such that any one numerical increment of the first set is disposed adjacent a corresponding numerical unit of the second set which together represent counter parts of the total length of the work piece plus a predetermined incremental amount.

10 Claims, 3 Drawing Sheets

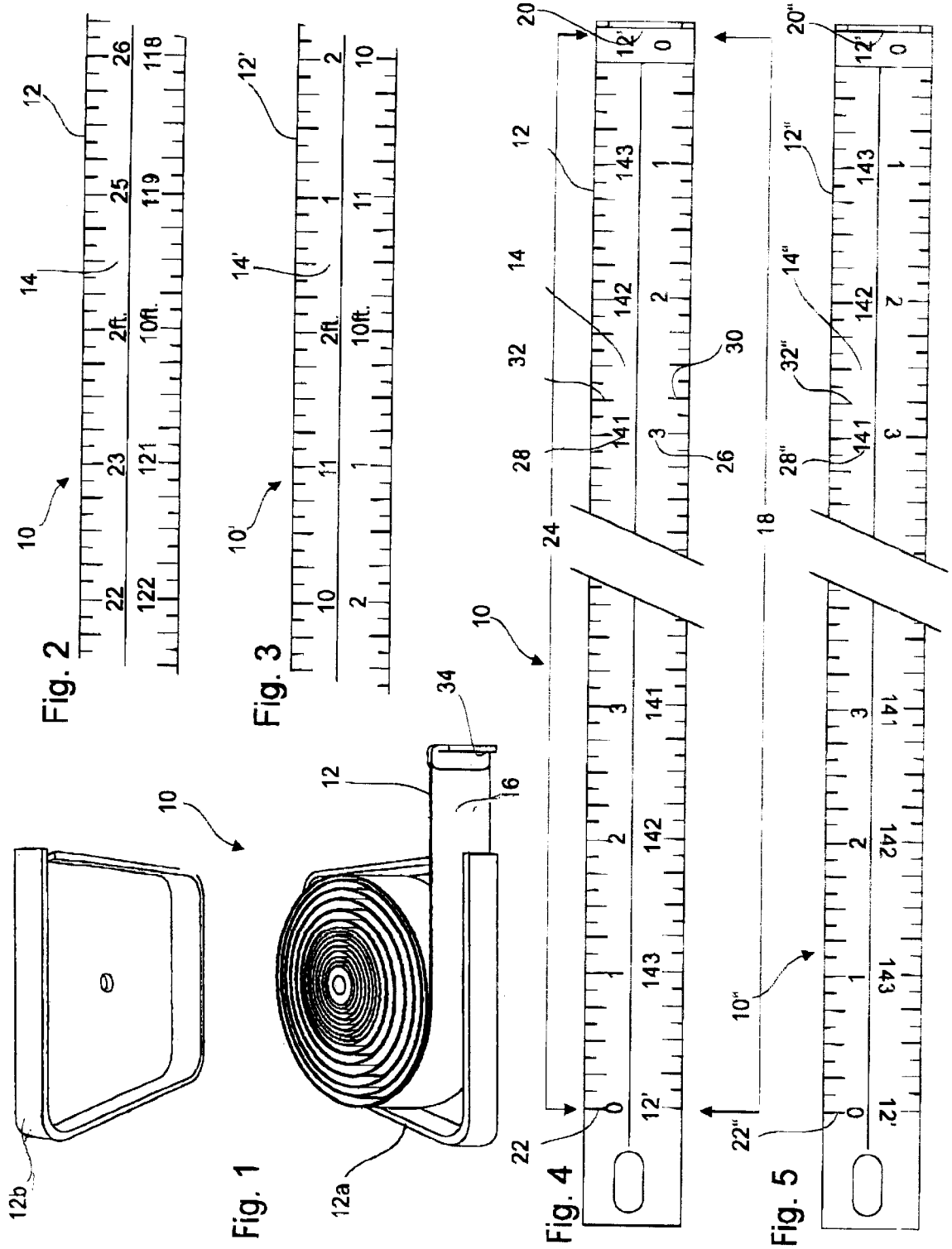

MEASURING TAPE FOR HANDLING DRYWALL

This is a continuation-in-part of U.S. application Ser. No. 09/384,676 filed Aug. 27, 1999, now abandoned.

BACKGROUND OF THE INVENTION

1. Field of Invention

The present invention relates to measuring devices. Particularly, this invention is directed to a measuring tape which includes a length substantially equal to an industry standardized length work piece and in one aspect having at least two sets of co-extending incrementally increasing measuring units printed thereon which run in opposite directions and are offset by a fixed predetermined amount to enable the user to quickly mark for cut off the unwanted amount of the work piece with the accounted for predetermined amount.

2. Prior Art

There exist numerous types of rulers for various types of applications. For example, there are carpenter's rules, framing rules, and protractors and tapes. The carpenter's rules are commonly marked with indicia, such as a plurality of spaced lines along the length of the rules. The rule also includes sequentially increasing numbers along the length thereof and which starts at one point and increase as it moves towards the other point. These rules also vary in the number system employed. For example, some rules provide measurement in increments of inches while others use increments of meters.

Flexible tapes, such as measuring tapes used in the fields of construction, commonly vary in length from twenty four to sixty eight feet in length. These tapes are usually made of plastic or metal and are fabricated in a manner to be spring loaded and removably retract within a housing. The housing is of a hand held size and is made of two symmetrical halves which are removably connected to one another by screws. The tape is numbered such that the markings increase as the tape is pulled from the housing. This first point of the tape which is pulled from the housing typically has a flange mounted on its point which serves two purposes. One is to keep the tape from retracting completely within the housing another is to permit the user to dispose the flange about an edge of a workpiece and move the housing along the work piece thus drawing the tape out of the housing. This permits length of the workpiece to be marked to a size. One patent U.S. Pat. No. 3,270,421 teaches of a rule having two main duplicate scales which start at opposite ends of the rule and run in ascending order in two different directions.

While these tapes are very useful for many applications in construction, there remains a need to improve the means for quickly enabling measuring and marking standard industry length work pieces in commercial applications. In the case of commercial drywall applications, these pieces come in standard lengths of twelve feet. The drywall is frequently cut to size a particular wall. The wall length opening is measured and the length cut. With large work pieces it is often desirable to determine the length to cut off the pieces because it is shorter in length and easier for the user to handle the tape and measure the shorter cut off piece. Of course this requires subtracting the length of the work piece from a standard twelve foot work piece. For some workers this is time concerning and mathematical problem.

The present invention solves this problem and provides the worker with measuring tape which can enable these cut offs to be quickly measured and made. The present invention further aims to provide the ability to calculate such cut off amount with the inclusion of an additional predetermined amount of material.

SUMMARY OF THE INVENTION

It is an object to improve measuring tapes.

It is another object to ease the method of measuring in the field of construction.

It is yet another object to provide a measuring tape calculates a cut off amount of material with the inclusion of an additional predetermined amount of material to be removed to provide an allowance whereby the desired retained material will measure slightly less than the measurement for cutoff.

Accordingly, the present invention is directed to a flexible measuring tape for use with a fixed length work piece, such as a standard drywall piece, which includes a measuring tape member which is of a length substantially equal to the work piece, wherein the member has a side which includes a first set of incremental sequentially increasing measuring units printed thereon which begin at a first point of the member and are equidistantly spatially positioned along the member through to a second point, and a second set of incremental sequentially increasing measuring units printed thereon which begin at the second point of the member and are equidistantly spatially positioned along the member through to the first point. The measuring work piece (i.e., 48") plus the predetermined incremental amount (i.e., ¼").

Other objects and advantages will be readily apparent to those skilled in the art upon viewing the drawings and reading the detailed description hereafter.

BRIEF DESCRIPTION OF THE DRAWINGS

FIG. 1 is a perspective view of the present invention disposed within a portion of a measuring tape housing.

FIG. 2 shows a part of the tape of the present invention.

FIG. 3 is another part of the tape of the present invention.

FIG. 4 depicts the tape of the present invention in parts.

FIG. 5 depicts another embodiment of a tape of the present invention in parts.

DETAILED DESCRIPTION OF THE INVENTION

Figure 6:
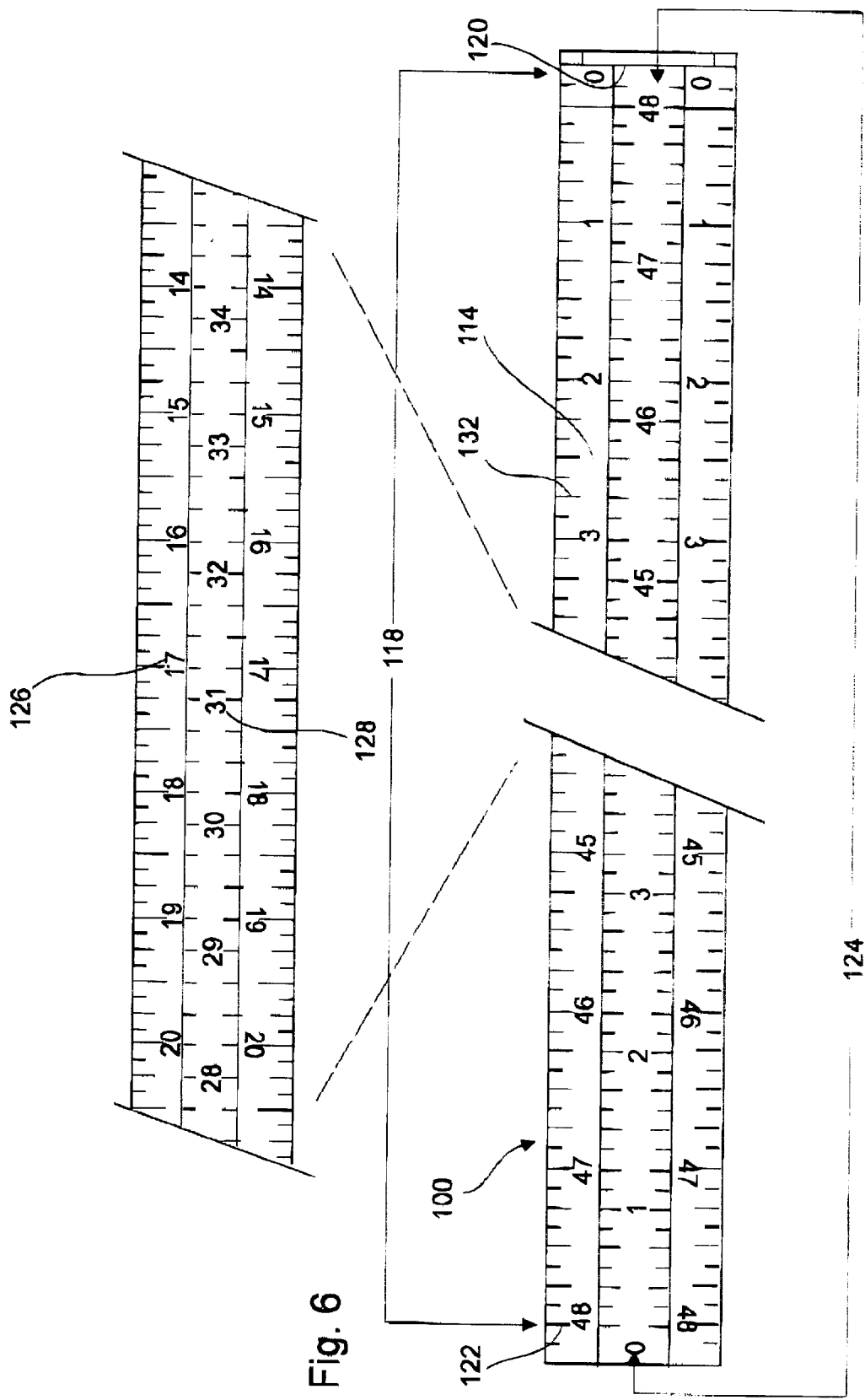
FIG. 6 shows a part of four foot tape of the present invention.
Figure 7:
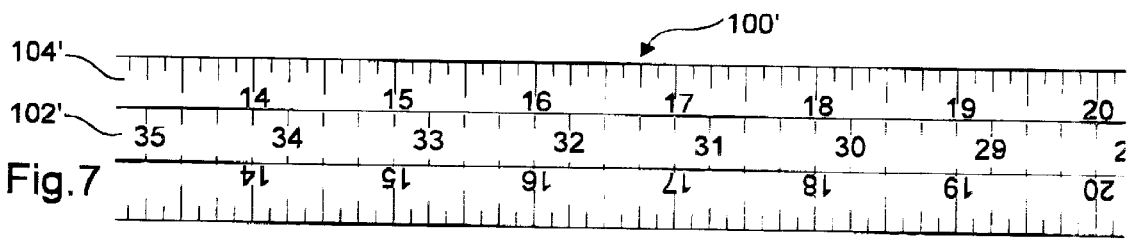
FIG. 7 is another embodiment of a four foot tape of the present invention.
Figure 8:
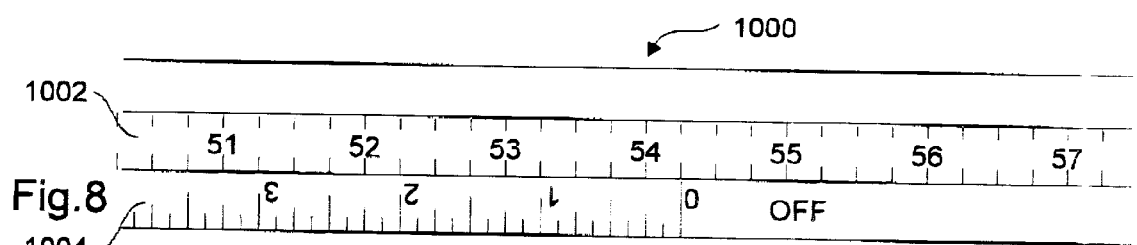
FIG. 8 shows a part of four and one half foot tape of the present invention.
Figure 9:
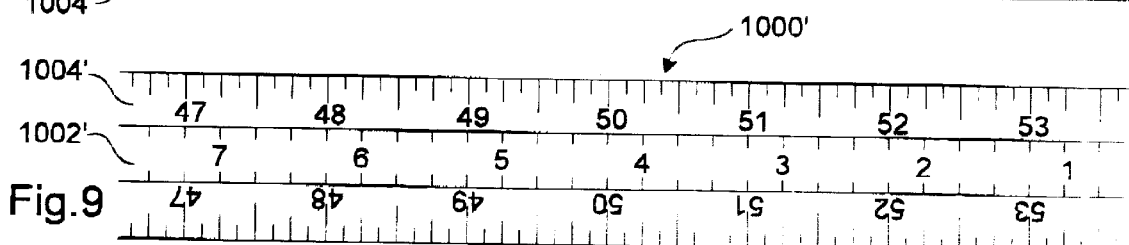
FIG. 9 is another embodiment of a four and one half foot tape of the present invention.
Figure 10:
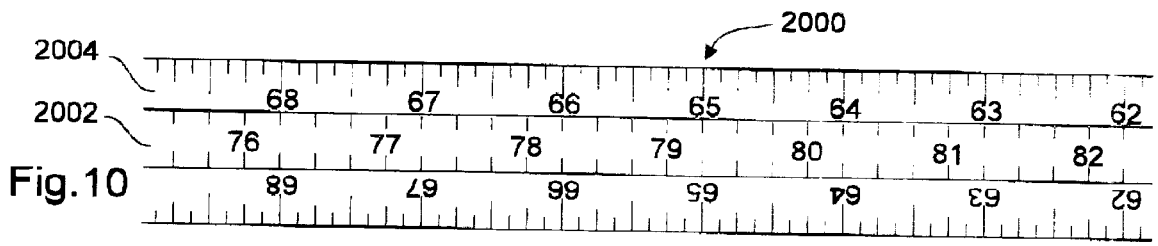
FIG. 10 shows a part of four twelve tape of the present invention.
Figure 11:
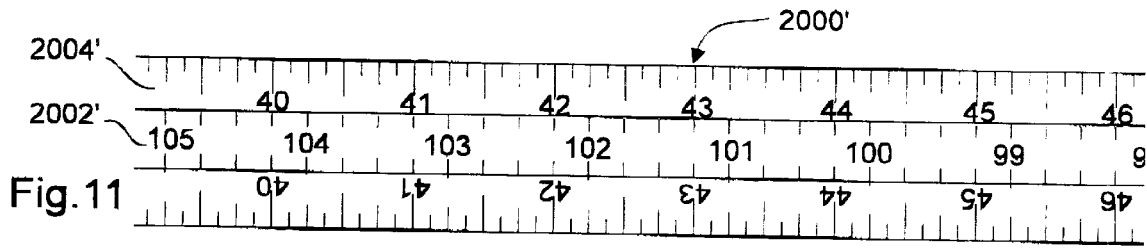
FIG. 11 is another embodiment of a twelve foot tape of the present invention.

Referring now to the drawings, the tape of present invention is generally depicted by the numerals 10, 10', 10", 100, 100', 1000, 1000', 2000' and 2000. The tape 10, 10' and 10" are function similarly, with the exception of orientation of measuring units thereon as can be seen from FIGS. 2–5. Accordingly, tape 10 is described with the understanding that tape 10' and 10" have corresponding features. The tape 10 can be plastic or metal or other suitable material and is in configuration is preferably suitable as removably retractable within tape measure housing parts 12a and 12b. The housing parts 12a and 12b are removably connectable from one another by screws for example. Preferably, the tape 10 is spring loaded within the housing parts 12a and 12b and is of a flexible configuration.

The flexible measuring tape 10 is particularly well suited for use with a fixed length work piece, such as a standard drywall piece. Commercial drywall comes in a standard twelve foot length. The invention is also applicable to other standard length work pieces. A benefit is gained from using such large sized work pieces in that the worker handles less work pieces in order to perform the particular construction projects. While the invention is particularly well suited for drywall applications, it is contemplated that the invention can have application to other areas of construction. The advantage gained by use of the present invention is that when dealing with such large work pieces, the user is provided with an easy mechanism by which to ascertain the amount of unwanted material to be cut off of the work piece without the need to perform any computation.

The tape 10 includes a measuring tape member 12 which is of a length substantially equal to the work piece, particularly here is shown equal to a twelve foot drywall sheet. The measuring tape member 12 has a measuring side 14 and a back side 16 which is commonly disposed on the work piece.

The measuring side 14 includes a first set 18 of incremental sequentially increasing measuring units printed on the measuring side 14 which begin at a first point 20 of the measuring tape member 12 and are equidistantly spatially positioned along the measuring tape member 12 through to a second point 22. A second set 24 of incremental sequentially increasing measuring units is printed on the measuring side 14 which begin at the second point 22 of the measuring tape member 12 and are equidistantly spatially positioned along the measuring tape member 12 through to the first point 20. The first set 18 and second set 24 are shown as including printed numbers 26 and 28, respectively, with a plurality of line markings 30 and 32, respectively, which serve to subdivide the numbers. These numbers 26 and 28 here represent inches, but the invention contemplates any measuring unit.

The numbers 26 and 28 as well as line markings 30 and 32 are positioned on the measuring side 14 in a manner such that any one numerical unit of the first set 18 is disposed adjacent a corresponding numerical unit of the second set 24 which together represent counter parts of the total length of the measuring tape, i.e., a twelve foot length. For example, FIG. 2 shows a number "25" across from a corresponding number "119" both of which here represent inches and when taken together as a whole equal 144 inches or twelve feet. FIGS. 2 and 4 represents a part of the measuring tape 10' which depicts the numbers printed upright with respect to one another and represents both one to twelve feet numbers and one to one hundred and forty four inch numbers. FIG. 3 depicts the numbers printed upright with respect to one another and represents both one to twelve feet numbers and one to twelve inch numbers which repeat between the foot numbers. FIG. 5 is similar to the embodiment in FIG. 4 with the exception that the numbers are upside down with respect to one another.

The point 20 is preferably formed with a flanged portion 34 which is used in a conventional manner as previously described. By so providing, the present invention has overcome the above mentioned problems and deficiencies in the art. Also, the measuring tape of the present invention can be employed as a retrofit for use with conventional measuring tapes by disassembling the housing of a conventional tape and interchanging the conventional tape with the measuring tape 10' of the present invention.

The tape 100, 100', 1000, 1000', 2000' and 2000 are likewise similar to one another with the exception of the length of tape. Tapes 100 and 100' correspond to a four foot tape, tapes 1000 and 1000' correspond to a four and one half foot tape and tapes 2000 and 2000' correspond to a twelve foot tape. Here, each of the tapes 100, 1000, and 2000 have an intermediate printed scale 102, 1002 and 2002 which are intended to measure the length of the material to be used, whereas each of the tapes 100', 1000', and 2000' have an edge printed scale 104', 1004' and 2004' which are intended to measure the length of the material to be used. Conversely, each of the tapes 100, 1000, and 2000 have an edge printed scale 104, 1004 and 2004 which are intended to provide the measure the length of the material to be cut off, whereas each of the tapes 100', 1000', and 2000' have an intermediate printed scale 102', 1002' and 2002' which are intended to measure the length of the material to be cut off. Note, that the scales for the material to be cut off is set at a predetermined incremental amount, for example, one quarter inch. This allows for a predetermined amount play in setting the material to be used in place. Here, any one numerical unit of a first set of numerical units is disposed adjacent a corresponding numerical unit of said second set which together substantially represent counter parts of the total length of the work piece plus the predetermined incremental amount.

The above described embodiments are set forth by way of example and are not for the purpose of limiting the present invention. It will be readily apparent to those skilled in the art that obvious modifications, derivations and variations can be made to the embodiments without departing from the scope of the invention. Accordingly, the claims appended hereto should be read in their full scope including any such modifications, derivations and variations.

What is claimed is:

1. A measuring tape for use with a fixed length work piece, which includes:

a measuring tape member having a marked portion which is of a length substantially equal to the work piece plus a fixed predetermined incremental amount;

a first set of incremental sequentially increasing measuring units printed longitudinally across a top of the marked portion on said first side which begin at a first point of said portion and are equidistantly spatially positioned along said portion through to a second point; and a second set of incremental sequentially increasing measuring units printed on a bottom of the portion of said first side which begin said fixed predetermined incremental amount before said second point of said portion and are equidistantly spatially positioned along said portion through to said first point; and wherein said measuring units are positioned in a manner such that any one numerical increment of said first set is disposed adjacent an opposing corresponding. numerical unit of said second set which together substantially represent counter parts of the total length of said work piece plus said fixed predetermined incremental amount.

2. The measuring tape of claim 1, wherein said measuring tape member is made of a flexible material.

3. The measuring tape of claim 1, which further includes a hand held housing having an opening therein, and wherein said measuring tape is characterized to be of a flexible material which is coiled and spring loaded within said housing such that said measuring tape is retractably removable from said housing.

4. The measuring tape of claim 1, wherein said first set of measuring units and said second set of measuring units each include printed numbers with an associated plurality of line markings which serve to subdivide the numbers.

5. The measuring tape of claim 1, wherein said numbers are printed right side up with respect to one another.

6. The measuring tape of claim 1, wherein said numbers are printed upside down with respect to one another.

7. The measuring tape of claim 1, wherein said first set of measuring units and said second set of measuring units each include printed numbers with an associated plurality of line markings which serve to subdivide the numbers.

8. The measuring tape of claim 1, wherein said numbers are printed right side up with respect to one another.

9. The measuring tape of claim 1, wherein said numbers are printed upside down with respect to one another.

10. A retrofit flexible measuring tape for use with a fixed length work piece, wherein said measuring tape is configured to be retrofit further includes a hand held housing having an opening therein, and wherein said measuring tape is characterized to be of a flexible material which is coiled and spring loaded within said housing such that said measuring tape is retractably removable from said housing, which includes:

a measuring tape member having a marked portion which is of a length substantially equal to the work piece plus a fixed predetermined incremental amount;

a first set of incremental sequentially increasing measuring units printed longitudinally across a top of the marked portion on said first side which begin at a first point of said portion and are equidistantly spatially positioned along said portion through to a second point; and a second set of incremental sequentially increasing measuring units printed on a bottom of the portion of said first side which begin said fixed predetermined incremental amount before said second point of said portion and are equidistantly spatially positioned along said portion through to said first point; and wherein said measuring units are positioned in a manner such that any one numerical increment of said first set is disposed adjacent an opposing corresponding numerical unit of said second set which together substantially represent counter parts of the totallength of said work piece plus said fixed predetermined incremental amount.

\* \* \* \* \*